(12) United States Patent
Naidu et al.

(10) Patent No.: US 11,895,732 B2
(45) Date of Patent: Feb. 6, 2024

(54) METHOD AND SYSTEM FOR PROVIDING PRIORITY COMMUNICATION IN A MISSION-CRITICAL PUSH-TO-TALK (MCPTT) SERVICE

(71) Applicant: Samsung Electronics Co., Ltd., Suwon-si (KR)

(72) Inventors: Naveen Kumar Srinivasa Naidu, Bangalore (IN); Aditya Prasad, Bangalore (IN); Chethan Mahadev, Bangalore (IN); Sahil Rayu, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 331 days.

(21) Appl. No.: 17/230,832

(22) Filed: Apr. 14, 2021

(65) Prior Publication Data
US 2021/0321483 A1 Oct. 14, 2021

(30) Foreign Application Priority Data

Apr. 14, 2020 (IN) .............................. 202041016146
Mar. 25, 2021 (IN) .............................. 202041016146

(51) Int. Cl.
*H04W 4/00* (2018.01)
*H04W 76/45* (2018.01)
(Continued)

(52) U.S. Cl.
CPC ............. *H04W 76/45* (2018.02); *H04W 4/10* (2013.01); *H04W 48/16* (2013.01); *H04W 76/11* (2018.02); *H04W 76/18* (2018.02)

(58) Field of Classification Search
CPC ........ H04W 76/45; H04W 4/10; H04W 48/16; H04W 4/90
See application file for complete search history.

(56) References Cited

U.S. PATENT DOCUMENTS

2010/0248771 A1* 9/2010 Brewer ................. H04W 72/56
455/518
2017/0245123 A1 8/2017 Baek et al.
(Continued)

FOREIGN PATENT DOCUMENTS

WO 2016/111528 A1 7/2016

OTHER PUBLICATIONS

"3rd Generation Partnership Project; Technical Specification Group Services and System Aspects; Mission Critical Services Common Requirements (MCCoRe); Stage 1 (Release 17)", 3GPP TS 22.280 V17.3.0 (Jul. 2020), 97 pages.
(Continued)

*Primary Examiner* — Omoniyi Obayanju

(57) ABSTRACT

The present disclosure relates to method performed by a mission critical push-to-talk (MCPTT) server, the method comprises: receiving, from a first user equipment (UE), a request for a connection to communicate with one or more second UEs, wherein the request includes at least a first priority score associated with a type of the connection; determining, based on the request, a second priority score corresponding to the first UE, wherein the second priority score is associated with a type information; and performing based on the first priority score and the second priority score one of: approving the request for the connection, or rejecting the request for the connection.

12 Claims, 7 Drawing Sheets

(51) Int. Cl.
*H04W 76/18* (2018.01)
*H04W 4/10* (2009.01)
*H04W 48/16* (2009.01)
*H04W 76/11* (2018.01)

(56) References Cited

U.S. PATENT DOCUMENTS

2018/0077552 A1  3/2018  Lee et al.
2018/0288827 A1  10/2018  Pattan et al.
2018/0316576 A1* 11/2018  Kang ................. H04L 41/08

OTHER PUBLICATIONS

International Search Report and Written Opinion of the International Searching Authority in connection with International Application No. PCT/KR2021/004656 dated Jul. 9, 2021, 8 pages.
Nokia et al., "Update service configuration to support limiting the number of authorized clients per MCPTT user", C1-202569, 3GPP TSG-CT WG1 Meeting #123-e, Electronic meeting, Apr. 16-24, 2020, 11 pages.
AT&T, "Configuration of resource priority for MCData emergency", C1-202386, 3GPP TSG CT WG1 Meeting#123-e, Electronic meeting, Apr. 16-24, 2020, 8 pages.
Examination report dated May 12, 2022, in connection with Indian Application No. 202041016146, 7 pages.
Varin, et al., "Test Scenarios for Mission Critical Push-To-Talk (MCPTT) Off-Network Mode Protocols Implementation," NISTIR 8236, National Institute of Standards and Technology, Oct. 2018, 139 pages.

* cited by examiner

| TYPE OF THE USER | SECOND PRIORITY SCORE |
|---|---|
| DISPATCHER | 7 |
| SUPERVISOR | 6 |
| NORMAL USER | 5 |
| ... | ... |

FIG.3D

|  | DISPATCHER | SUPERVISOR | NORMAL USER | ... |
|---|---|---|---|---|
| EMERGENCY CALL | 7 | 7 | 7 | ... |
| IMMINENT PERIL CALL | 6 | 6 | 6 | ... |
| AMBIENT CALL | 5 | 4 | 4 | ... |
| BROADCAST CALL | 4 | 4 | 3 | ... |
| NORMAL CALL | 3 | 3 | 3 | ... |

FIG.3E

METHOD AND SYSTEM FOR PROVIDING PRIORITY COMMUNICATION IN A MISSION-CRITICAL PUSH-TO-TALK (MCPTT) SERVICE

CROSS REFERENCE TO RELATED APPLICATIONS

This application is based on and claims priority under 35 U.S.C. § 119 to Indian Provisional Patent Application No. 202041016146 which was filed on Apr. 14, 2020, and Indian Complete Patent Application No. 202041016146 which was filed on Mar. 25, 2021, the disclosures of which are herein incorporated by reference in their entirety.

BACKGROUND

1. Field

The present disclosure generally relates to communication system. More particularly, the present disclosure relates to a method and system for providing role-level-priority for mission-critical push-to-talk (MCPTT).

2. Description of the Related Art

Generally, an MCPTT service is intended to support mobile communication between several users (a group call), where each user has the ability to gain access to a permission to talk in an arbitrated manner. MCPTT is primarily targeted to provide a professional push-to-talk (PTT) service to entities that are related to, for example, public safety, transport companies, utilities, and industrial and nuclear plants. The users of MCPTT service are provided with different priorities to access network resources, in order to provide means to prioritize between calls, when resources are scarce. Currently, during an MCPTT session, standards are present for priorities such as (a) priorities based on groups, (b) priorities based on the service and (c) priorities based on criticality of situations. As an example, priorities based on groups may be related to broadcast calls, emergency, imminent peril call and the like. As an example, priorities based on the service may be related to services such as police, fire brigade, ambulance and the like.

However, currently, there are no standards for prioritizing based on role of the caller. As an example, role of the caller may be a commander, leader, normal user and the like. Hence, in critical situations, a high role user's call may be override by a low role user's call, when the high role user may not initiate a higher priority call compared to the low role user. Such circumstances may not enable the high role user to communicate with appropriate users on priority to handle the critical situation. Therefore, there is a need for a method and a system to establish a standard for prioritizing calls based on role of the caller.

SUMMARY

The present disclosure discloses a method for providing priority for call connectivity in an MCPTT. The method comprises receiving a request for a connection from a first user equipment (UE) associated with a first user to communicate with one or more second UEs associated with one or more second users. The request includes at least a first priority score associated with a type of the connection. Further, the method comprises determining a second priority score corresponding to the first user from the request, wherein the second priority score is associated with a type of the user. Furthermore, the method comprises performing one of approving the request for the connection, or rejecting the request for the connection based on the first priority score and the second priority score.

In one embodiment, the first priority score (302) is a number indicating a preference associated with the type of the connection (301), wherein the type of the connection (301) indicates at least one of a normal call, a broadcast call, an ambient call, an imminent peril call, or an emergency call.

In one embodiment, the second priority score (305) is a number indicting a preference associated with the type of the user (304), wherein the type of the user (304) indicates at least one of a normal user, a supervisor, or a dispatcher.

In one embodiment, the determining the second priority score (305) comprises identifying a user identity value corresponding to the first user based on the request (104); obtaining the type of the user (304) from a database associated with the MCPTT server (102) using the user identity value; and retrieving the second priority score (305) corresponding to the type of the user (304) from a storage medium associated with the MCPTT server (102).

In one embodiment, the approving the request (104) for the connection comprises: identifying the first priority score (302) and the second priority score (305) associated with a pre-existing connection corresponding to the one or more second users; comparing a combination of the first priority score (302) and the second priority score (305) associated with the pre-existing connection with the combination of the first priority score (302) and the second priority score (305) associated with the request (104) for the connection made by the first user; pre-empting the pre-existing connection when the combination of the first priority score (302) and the second priority score (305) associated with the pre-existing connection is lesser than the combination of the first priority score (302) and the second priority score (305) associated with the request (104) for the connection; and approving the request (104) for the connection.

In one embodiment, the rejecting the request (104) for the connection comprises: identifying the first priority score (302) and the second priority score (305) associated with a pre-existing connection corresponding to the one or more second users; comparing a combination of the first priority score (302) and the second priority score (305) associated with the pre-existing connection with the combination of the first priority score (302) and the second priority score (305) associated with the request (104) for the connection made by the first user; and rejecting the request (104) for the connection when the combination of the first priority score (302) and the second priority score (305) associated with the pre-existing connection is greater than the combination of the first priority score (302) and the second priority score (305) associated with the request (104) for the connection.

In one embodiment, the method comprises identifying the first priority score (302) associated with the pre-existing connection; retaining the first priority score (302) associated with the request (104) when the first priority score (302) associated with the request (104) is greater than the second priority score (305) associated with the request (104); modifying the first priority score (302) associated with the request (104) to the second priority score (305) associated with the request (104) when the first priority score (302) associated with the request (104) is lesser than the second priority score (305) associated with the request (104); and performing one of: approving the request (104) for the connection when the first priority score (302) associated with the request (104) is greater than the first priority score (302) associated with the pre-existing connection, or rejecting the request (104) for the connection when the first priority score (302) associated with the request (104) is lesser than the first priority score (302) associated with the pre-existing connection.

In one embodiment, the method comprises dynamically modifying the second priority score (305) associated with the type of the user (304) by an administrator associated with the MCPTT server (102).

The present disclosure discloses an MCPTT server for providing priority for call connectivity in (MCPTT) service. The MCPTT server comprises a processor, and a memory communicatively coupled to the processor. The memory stores the processor executable instruction which on execution causes the processor to receive a request for a connection from a first UE associated with a first user to communicate with one or more second UEs associated with one or more second users, wherein the request includes at least a first priority score associated with a type of the connection. Further, the instructions cause the processor to determine a second priority score corresponding to the first user from the request, wherein the second priority score is associated with a type of the user. Furthermore, the instructions cause the processor to perform based on the first priority score and the second priority score one of approving the request for the connection or rejecting the request for the connection.

In one embodiment, the processor is configured to determine the second priority score (305) comprises: identifying a user identity value corresponding to the first user based on the request (104); obtaining the type of the user (304) from a database associated with the MCPTT server (102) using the user identity value; and retrieving the second priority score (305) corresponding to the type of the user (304) from a storage medium associated with the MCPTT server (102).

In one embodiment, the processor is configured to approve the request (104) for the connection comprises: identifying the first priority score (302) and the second priority score (305) associated with a pre-existing connection corresponding to the one or more second users; comparing a combination of the first priority score (302) and the second priority score (305) associated with the pre-existing connection with the combination of the first priority score (302) and the second priority score (305) associated with the request (104) for the connection made by the first user; pre-empting the pre-existing connection when the combination of the first priority score (302) and the second priority score (305) associated with the pre-existing connection is lesser than the combination of the first priority score (302) and the second priority score (305) associated with the request (104) for the connection; and approving the request (104) for the connection.

In one embodiment, the processor is configured to reject the request (104) for the connection comprises: identifying the first priority score (302) and the second priority score (305) associated with a pre-existing connection corresponding to the one or more second users; comparing a combination of the first priority score (302) and the second priority score (305) associated with the pre-existing connection with the combination of the first priority score (302) and the second priority score (305) associated with the request (104) for the connection made by the first user; and rejecting the request (104) for the connection when the combination of the first priority score (302) and the second priority score (305) associated with the pre-existing connection is greater than the combination of the first priority score (302) and the second priority score (305) associated with the request (104) for the connection.

In one embodiment, the processor is configured to determine the second priority score (305) comprises: identifying a user identity value corresponding to the first user based on the request (104); obtaining the type of the user (304) from a database associated with the MCPTT server (102) using the user identity value; and retrieving the second priority score (305) corresponding to the type of the user (304) from a storage medium associated with the MCPTT server (102).

In one embodiment, the processor is configured to identify the first priority score (302) associated with the pre-existing connection; retain the first priority score (302) associated with the request (104) when the first priority score (302) associated with the request (104) is greater than the second priority score (305) associated with the request (104); modify the first priority score (302) associated with the request (104) to the second priority score (305) associated with the request (104) when the first priority score (302) associated with the request (104) is lesser than the second priority score (305) associated with the request (104); and perform one of: approving the request (104) for the connection when the first priority score (302) associated with the request (104) is greater than the first priority score (302) associated with the pre-existing connection, or rejecting the request (104) for the connection when the first priority score (302) associated with the request (104) is lesser than the first priority score (302) associated with the pre-existing connection.

In one embodiment, the processor is configured to dynamically modify the second priority score (305) associated with the type of the user (304) based on an input received from an administrator associated with the MCPTT server (102).

The present disclosure also discloses a method for assigning priority in an MCPTT communication service. The method comprises receiving an MCPTT call request having a first priority score, from a UE associated with a user. Further, the method comprises determining a second priority score of the user. Thereafter, the method comprises comparing the first priority score and the second priority score with a permutation table and providing a reservation priority score to the user based on the comparison.

In one embodiment, the permutation table is created by an administrator.

In one embodiment, the second priority score (305) includes a role of the user.

In one embodiment, during a conflict between MCPTT calls, the first priority score (302) and second priority score (305) of the MCPTT calls are compared with the permutation table and the reservation priority score is assigned by the MCPTT server (102).

In one embodiment, for the MCPTT calls having the conflict the reservation priority score is provided based on first in first out (FIFO) manner.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 3D illustrates a table indicating a second priority score associated with type of the user in accordance with some embodiments of the present disclosure;

FIG. 3E illustrates a table indicating a combination of first priority score and second priority score in accordance with some embodiments of the present disclosure;

DETAILED DESCRIPTION

Figure 1:
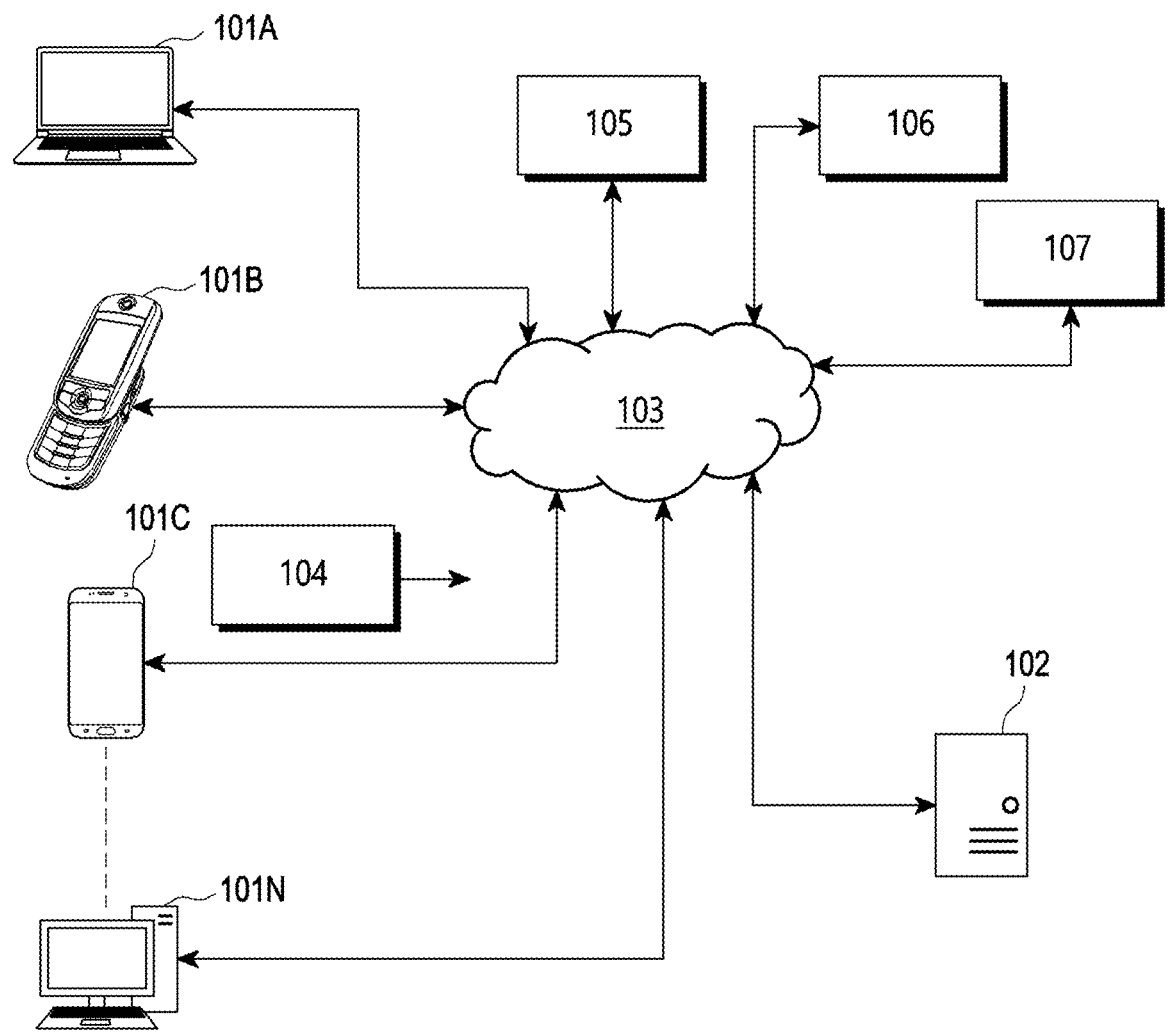
FIG. 1 illustrates an exemplary environment for providing a priority for call connectivity in (MCPTT) service in accordance with some embodiments of the present disclosure.

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a device or system or apparatus proceeded by "comprises . . . a" does not, without more constraints, preclude the existence of other elements or additional elements in the device or system or apparatus.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 shows an exemplary environment for providing priority for call connectivity in an MCPTT service, in accordance with some embodiments of the present disclosure.

In one embodiment, an MCPTT service is a push-to-talk based communication service (such as walkie-talkie) for supporting mission-critical organizations (such as railways, Fire department, Police department, and the like) and mission-critical applications (such as public safety, fire breakout situation, and the like). The MCPTT service ensures network availability, network performance, and network security for the user communicating via the MCPTT service. The MCPTT service provides communication of voice information, data (such as location information, files, and the like), and multimedia information (such as images, videos, animation, and the like) between one or more users (i.e., one or more MCPTT users). The one or more users of the MCPTT service communicate via a communication network (103) using one or more user equipment's (UE) (101A, 101B, ..., 101N) with the capability to participate in MCPTT services. The communication network (103) includes at least one of a $3^{rd}$ generation network, a long term evolution network, a $4^{th}$ generation network, a $5^{th}$ generation network, a Wi-Fi network, sensor network, an Internet of Things (IoT) network, direct communication networks, or the like. The UE (101A, 101B, ..., 101N) used for communication using the MCPTT service includes at least one of a mobile phone, a laptop computer, a desktop computer, a tablet computer, a user wearable device, a standalone device based on PTT, or the like. One or more first users may initiate an MCPTT call for communicating with one or more second users via an MCPTT server (102). The MCPTT server (102) is used to arbitrate the MCPTT calls and manage network resources associated with an MCPTT service such as bandwidth, frequency of operation, a time duration and the like. As a user uses a UE, the user is referred to UE. For example, the first user using first UE is referred to the as first UE, In an embodiment, the MCPTT server (102) receives a request (104) for a connection (i.e., a request (104) for the MCPTT call) from a first UE (101A, 101B, ..., 101N) associated with a first user from the one or more users to communicate with one or more second UEs (101A, 101B, ..., 101N) associated with the one or more second users from the one or more users. The terms "connection" and "MCPTT call" are used interchangeably in the present disclosure. The request (104) includes at least a first priority score associated with a type of the connection. The type of the connection indicates a type of the MCPTT call requested by the first user. The type of the connection includes one of a normal call (or a private call), a broadcast call, an imminent peril call, an ambient call, an emergency call, a system call, and the like. The first priority score indicates a value associated with the type of the connection. For example, the first priority score for the normal call is 3, for the emergency call is 7, and the like. For example, the request (104) for the connection having a higher value of the first priority score is approved by the MCPTT server (102).

In an embodiment, the MCPTT server (102) determines a second priority score corresponding to the first user from the request (104). The second priority score is associated with a type of the user (304). The type of the user may be referred to type information. The type of the user (304) indicates a role assigned to the first user. For example, the type of the user (304) may include one of a normal user (normal UE), a supervisor (supervisor UE), a dispatcher (dispatcher UE), an administrator (administrator device), or the like. The type of user is not limited to the above-mentioned types and can include other types. Type of user may vary for different applications. For example, a fire safety department may have different types of users, a police department may have different types of users. The type of the user (304) may be configured by an organization in the MCPTT server (102). Further, the second priority score may be set for each type of user. For example, the second priority score for a normal user is 5, for a supervisor is 6, for a dispatcher is 7, and the like. In one embodiment, the MCPTT server (102) may determine the second priority score from a database like home subscriber server (HSS) (105) based on the type of the user (304) corresponding to the first user in the request (104). The database like HSS (105) includes user-related and subscription-related information. The functions of the HSS (105) include functionalities such as, user authentication, access authorization and user profiles.

In an embodiment, the MCPTT server (102) performs one of approving the request (104) for the connection or rejecting the request (104) for the connection based on different combinations of the first priority score and the second priority score. In a first embodiment, the MCPTT may approve or reject the request (104) for connection based on the first priority score. For example, if two requests for connection is received, then the MCPTT server (102) may approve the request (104) for connection with a higher value of the first priority score from the two requests for connection. In a second embodiment, the MCPTT may approve or reject the request (104) for connection based on the second priority score. For example, if two requests for connection is received, then the MCPTT server (102) may approve the request (104) for connection with a higher value of the second priority score from the two requests for connection. In a third embodiment, the MCPTT may approve or reject the request (104) for connection based on the first priority score and the second priority score. The MCPTT server (102) determines a combination of the first priority score and the second priority score corresponding to the request (104) for the connection. Further, the MCPTT server (102) may approve or reject the request (104) for the connection based on the combination. The combination may include one or more statistical operations such as a sum, a product, an average, a combination thereof, and the like. For example, if two requests for connection are received, then the MCPTT server (102) may approve the request (104) for connection with a higher value of the combination of the first priority score and the second priority score from the two requests for connection.

In an embodiment, the MCPTT server (102) receives the request (104) for establishing an MCPTT call from the first UE (101A, 101B, ..., 101N) associated with a user (e.g., first user). The request (104) includes at least a first priority score associated with a type of the connection. The first priority score indicates a value associated with the type of the connection. For example, the request (104) for the connection having a higher value of the first priority score is approved by the MCPTT server (102). Further, the MCPTT server (102) determines a second priority score of the user. In an embodiment, the request (104) may include the type or role of the user and the MCPTT server (102) determines the second priority score corresponding to the type of user. The type of the user (304) may be configured by the organization in the MCPTT server (102). Further, the second priority score may be set for each type of user by an administrator in the organization. For example, the second priority score for a normal user may be set as 5, and the second priority score for a supervisor may be set as 6. In an embodiment, the MCPTT server (102) may determine the second priority score from a database such as the HSS (105) based on the type of the user. Further, the MCPTT server (102) compares the first priority score and the second priority score with a permutation table (as shown in FIG. 3D and FIG. 3E which are explained in detail further in the description). In an embodiment, the MCPTT server (102) compares a cumulative score of the first priority score and the second priority score corresponding to the user with other cumulative scores in the permutation table which corresponds to other users. Further, the MCPTT server (102) provides a reservation priority score for the user based on the cumulative score of the user. The MCPTT call is established by the MCPTT server (102) for users in the order of higher reservation priority score.

In an embodiment, when there is a conflict between MCPTT call requests, the MCPTT server (102) compares the first priority score and the second priority score of the MCPTT call requests with the permutation table and provides the reservation priority score. For example, when two MCPTT call requests are made where the cumulative score of the MCPTT call requests are the same, then the MCPTT server (102) compares the first and second priority score of a first MCPTT call and the first and second priority score of a second call with the permutation table. For instance, the first MCPTT call may have a first priority score of 7 and a second priority score of the user making the first MCPTT call of 1, and the second MCPTT call may have a first priority score of 3 and the user making the second MCPTT call may be 5. As the cumulative score associated with the first MCPTT call request and the second MCPTT call request is 8, the MCPTT server (102) may provide a higher reservation priority score in a FIFO manner. In the above instance, the second first MCPTT call be requested earlier, hence the first MCPTT call request may be provided a higher reservation priority score and the second MCPTT call request may be added to a queue having a cumulative score of 8.

In an embodiment, the MCPTT service may include additional elements such as an evolved packet core (EPC) that includes a policy and charging rules function (PCRF) (106), a call session control function (CSCF) (107), the home subscriber server (HSS (105)) (105) for establishing, managing, and terminating the MCPTT call. The person skilled in the art appreciates the use of above-said elements in the MCPTT service as detailed in 3GPP standards. The EPC is a framework for providing converged voice and data on a 4$^{th}$ generation networks and LTE networks. The UE (101A, 101B, ..., 101N) can communicate with the EPC via a base station, E-UTRAN, evolved NodeB (eNodeB), and the like (not shown in figures). Further, the EPC includes a serving gateway, the packet data node gateway, a mobility management entity, and the like.

In an embodiment, the MCPTT server (102) comprises a processor and a memory communicatively coupled to the processor. The memory stores the processor-executable instruction which on execution causes the processor to approve or reject the request (104) for connection from the first user based on at least one of the first priority score or the second priority score. Further, the first priority score, the second priority score, the type of the user (304), and the type of connection may be stored in the memory of the MCPTT server (102). In another embodiment, the first priority score, the second priority score, the type of the user (304), and the type of connection may be stored in the HSS (105).

In an embodiment, the aspects of the present disclosure is applicable to other mission critical communication services such as rich communication services (RCS) messaging, mission critical video/data communication over LTE (messaging and/or call), mission critical broadcast messaging and the like. The present disclosure is described with respect to MCPTT as an example only and should not be considered as a limitation. A person skilled in the art will appreciate that the provided method of optimizing priority of communication can be implemented to other types of mission critical messaging and/or call services.

Figure 2:
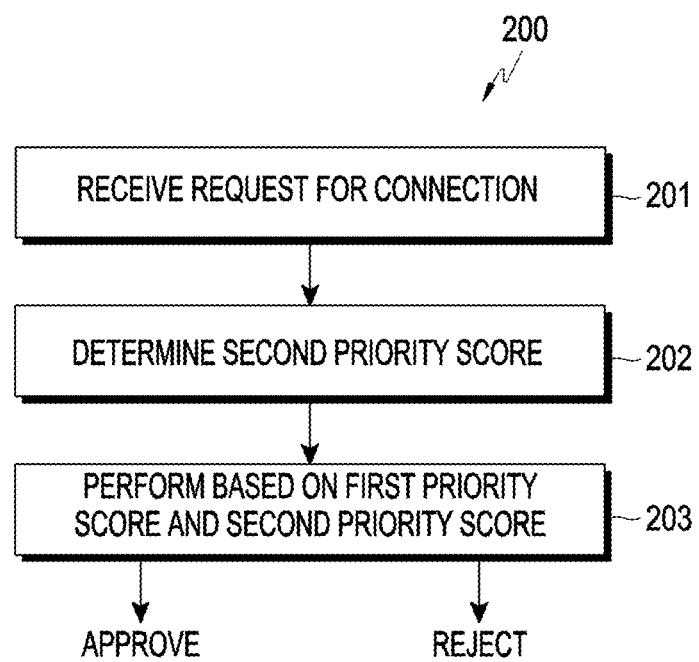
FIG. 2 shows an exemplary flowchart illustrating the method steps of providing a priority for call connectivity in (MCPTT) service in accordance with some embodiments of the present disclosure.

FIG. 2 shows a flowchart for providing priority for call connectivity in the MCPTT service, in accordance with some embodiments of the present disclosure.

Figure 3A:
FIG. 3A illustrates a request for connection from a first user sent to an MCPTT server in accordance with some embodiments of the present disclosure.

At the step (201), the MCPTT server (102) receives the request (104) for the connection from the first UE (101A, 101B, ..., 101N) associated with the first user to communicate with the one or more second UEs (101A, 101B, ..., 101N) associated with the one or more second users as shown in FIG. 3A. The request (104) includes at least the first priority score associated with a type of the connection (301).

Figure 3B:
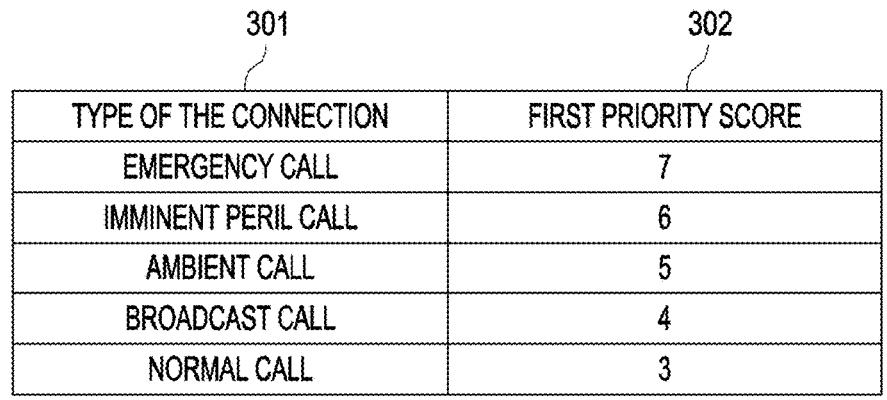
FIG. 3B illustrates a table indicating a first priority score associated with type of the connection in accordance with some embodiments of the present disclosure.

In an embodiment, the first priority score is a number indicating the preference associated with the type of the connection (301). The type of the connection (301) indicates at least one of the normal call, the broadcast call, the ambient call, the imminent peril call, or the emergency call. The normal call is a private call between the first user and the second user. The broadcast call is a group call from the first user to a plurality of second users. The imminent peril call from the first user to the one or more second users may be a private call, or a group call and indicates a requirement of an urgent action before the occurrence of an emergency situation. The ambient call indicates a passive listening mode in an existing MCPTT call. The emergency call indicates a report of the emergency situation by the first user. For example, the first priority score (302) associated with the type of the connection (301) is shown in FIG. 3B.

In an embodiment, the request (104) for connection indicates at least one of a new MCPTT call request (104), a floor request (104) in a pre-existing (i.e., ongoing) MCPTT call, or the like. The person skilled in the art appreciates the use of MCPTT message protocol such as INVITE request (104) for sending the request (104) for the connection to the MCPTT server (102).

At the step (202), the MCPTT server (102) determines the second priority score corresponding to the first user from the request (104). The second priority score is associated with the type of the user (304).

Figure 3C:
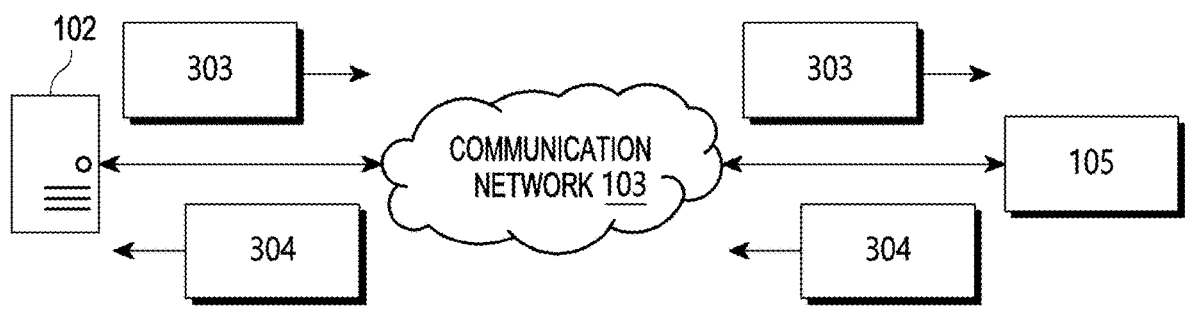
FIG. 3C illustrates determining a type of the user based on the request for the connection in accordance with some embodiments of the present disclosure.

In an embodiment, for determining the second priority score, the MCPTT server (102) identifies a user identity value corresponding to the first user based on the request (104). For example, the user identity value may indicate an internet protocol (IP) multimedia subsystem (IMS) public user identity (IMPU) received in the request (104). The MCPTT server (102) provides the IMPU (303) of the first user to the HSS (105) and requests the type of the user (304) associated with the IMPU (303) as shown in FIG. 3C. Further, the MCPTT server (102) obtains the type of the user (304) from a database (i.e., HSS (105)) associated with the MCPTT server (102) using the user identity value as shown in FIG. 3C. For example, the type of the user (304) indicates the "ParticipantType" of the first user such as the normal user, the supervisor, the dispatcher, the administrator, and the like. Furthermore, the MCPTT server (102) retrieves the second priority score corresponding to the type of the user (304) from a storage medium (i.e., memory) associated with the MCPTT server (102). For example, the second priority score (305) corresponding to the type of the user (304) is as shown in FIG. 3D.

At the step (203), the MCPTT server (102) performs one of approving the request (104) for the connection or rejecting the request (104) for the connection based on the first priority score (302) and the second priority score (305).

In an embodiment, for approving the request (104) for the connection, the MCPTT server (102) identifies the first priority score (302) and the second priority score (305) associated with a pre-existing connection corresponding to the one or more second users. For example, if the first user is requesting a connection with the second user and the second user is associated with the ongoing MCPTT call, then the ongoing MCPTT call is the pre-existing connection and the MCPTT server (102) identifies the first priority score (302) associated with the pre-existing connection and the second priority score (305) associated with the second user. Further, the MCPTT server (102) compares a combination of the first priority score (302) and the second priority score (305) associated with the pre-existing connection with the combination of the first priority score (302) and the second priority score (305) associated with the request (104) for the connection made by the first user. The combination may include one or more statistical operations such as a sum, a product, an average, a combination thereof, and the like. For example, using the sum as the statistical operation the combination is computed as "First priority score (302)+ Second priority score (305)". For example, using the product as the statistical operation the combination is computed as "First priority score (302)*Second priority score (305)". Furthermore, the MCPTT server (102) pre-empts the pre-existing connection when the combination of the first priority score (302) and the second priority score (305) associated with the pre-existing connection is lesser than the combination of the first priority score (302) and the second priority score (305) associated with the request (104) for the connection. Thereafter, the MCPTT server (102) approves the request (104) for the connection. For example, if the first priority score (302) is "3" and the second priority score (305) is "5" and the combination is "3+5=8" for the pre-existing connection, and if the first priority score (302) is "3" and the second priority score (305) is "6" and the combination is "3+6=9" for the request (104) for a new connection, then the MCPTT server (102) pre-empts the pre-existing call and approves the request (104) for the new connection. The pre-emption of the pre-existing call includes terminating the on-going call-in order to free up resources for a higher priority call request (104).

In an embodiment, when the combination of the first priority score (302) and the second priority score (305) associated with the pre-existing connection is equal to the combination of the first priority score (302) and the second priority score (305) associated with the request (104) for the new connection, the MCPTT server (102) may place the request (104) for the connection in a queue associated with the MCPTT server (102). That is, when two or more MCPTT calls have a conflict due to similar or same aggregate of the first priority score (302) and the second priority score (305), the MCPTT server (102) provides the reservation priority score to one of the MCPTT calls and queues the rest of the MCPTT calls. Further, the queue is operated on a FIFO mechanism to process a plurality of requests stored in the queue. For example, if the queue full, the request (104) for the connection is rejected and if the queue is not full, the request (104) for connection is approved after processing the plurality of the requests in the queue.

In an embodiment, for rejecting the request (104) for the connection, the MCPTT server (102) identifies the first priority score (302) and the second priority score (305) associated with the pre-existing connection corresponding to the one or more second users. Further, the MCPTT server (102) compares the combination of the first priority score (302) and the second priority score (305) associated with the pre-existing connection with the combination of the first priority score (302) and the second priority score (305) associated with the request (104) for the connection made by the first user. Furthermore, the MCPTT server (102) rejects the request (104) for the connection when the combination of the first priority score (302) and the second priority score (305) associated with the pre-existing connection is greater than the combination of the first priority score (302) and the second priority score (305) associated with the request (104) for the connection. In one embodiment, the MCPTT server (102) may place the request (104) for the connection in a queue associated with the MCPTT server (102) when the queue is not full as the alternative to rejecting the request (104) for the connection. For example, if the first priority score (302) is "5" and the second priority score (305) is "6" and the combination is "5+6=11" for the pre-existing connection, and if the first priority score (302) is "4" and the second priority score (305) is "5" and the combination is "4+5=9" corresponding to the request (104) for the connection, then the MCPTT server (102) rejects the request (104) for the connection when the queue is full or places the request (104) for the connection when the queue is not full.

In an embodiment, the MCPTT server (102) may store a pre-defined combination of first priority score (302) and the second priority score (305) in the storage medium (i.e., memory) of the MCPTT server (102) as shown in FIG. 3E. Further, the MCPTT server (102) may approve or reject the request (104) for the connection using the pre-defined combination. For example, if the pre-existing connection (i.e., the dispatcher associated with the broadcast call) has the combination of the "4" and the request (104) for the connection (i.e., the normal user requests the Imminent peril call to the dispatcher) has the combination as "6," then the MCPTT server (102) pre-empts the dispatcher from the broadcast call and connects the dispatcher to the first user (i.e., normal user) initiating the request (104) for the connection.

In an embodiment, the administrator may dynamically modify the second priority score (305) associated with the type of the user (304) stored in the MCPTT server (102). For example, consider the normal user with the second priority score (305) of "5," reports an emergency situation such as a fire break-out in a mall. Then, the administrator dynamically modifies the second priority score (305) associated with the normal user from "5" to "6" as the call initiated from the normal user in the mall needs to be given a higher priority due to emergency situation.

In an embodiment, the MCPTT server (102) may approve or reject the request (104) for the connection by comparing the first priority score (302) of the pre-existing connection with the second priority score (305) of the request (104) for the connection or vice versa (i.e., without computing the combination of the first priority score (302) and the second priority score (305) using the one or more statistical operations).

In an embodiment, the MCPTT server (102) may identify the first priority score (302) associated with the pre-existing connection. Further, the MCPTT server (102) may retain the first priority score (302) associated with the request (104) when the first priority score (302) associated with the request (104) is greater than the second priority score (305) associated with the request (104). Furthermore, the MCPTT server (102) may modify the first priority score (302) associated with the request (104) to the second priority score (305) associated with the request (104) when the first priority score (302) associated with the request (104) is lesser than the second priority score (305) associated with the request (104). Thereafter, the MCPTT server (102) may approve the request (104) for the connection when the first priority score (302) associated with the request (104) is greater than the first priority score (302) associated with the pre-existing connection or reject the request (104) for the connection when the first priority score (302) associated with the request (104) is lesser than the first priority score (302) associated with the pre-existing connection.

Figure 4:
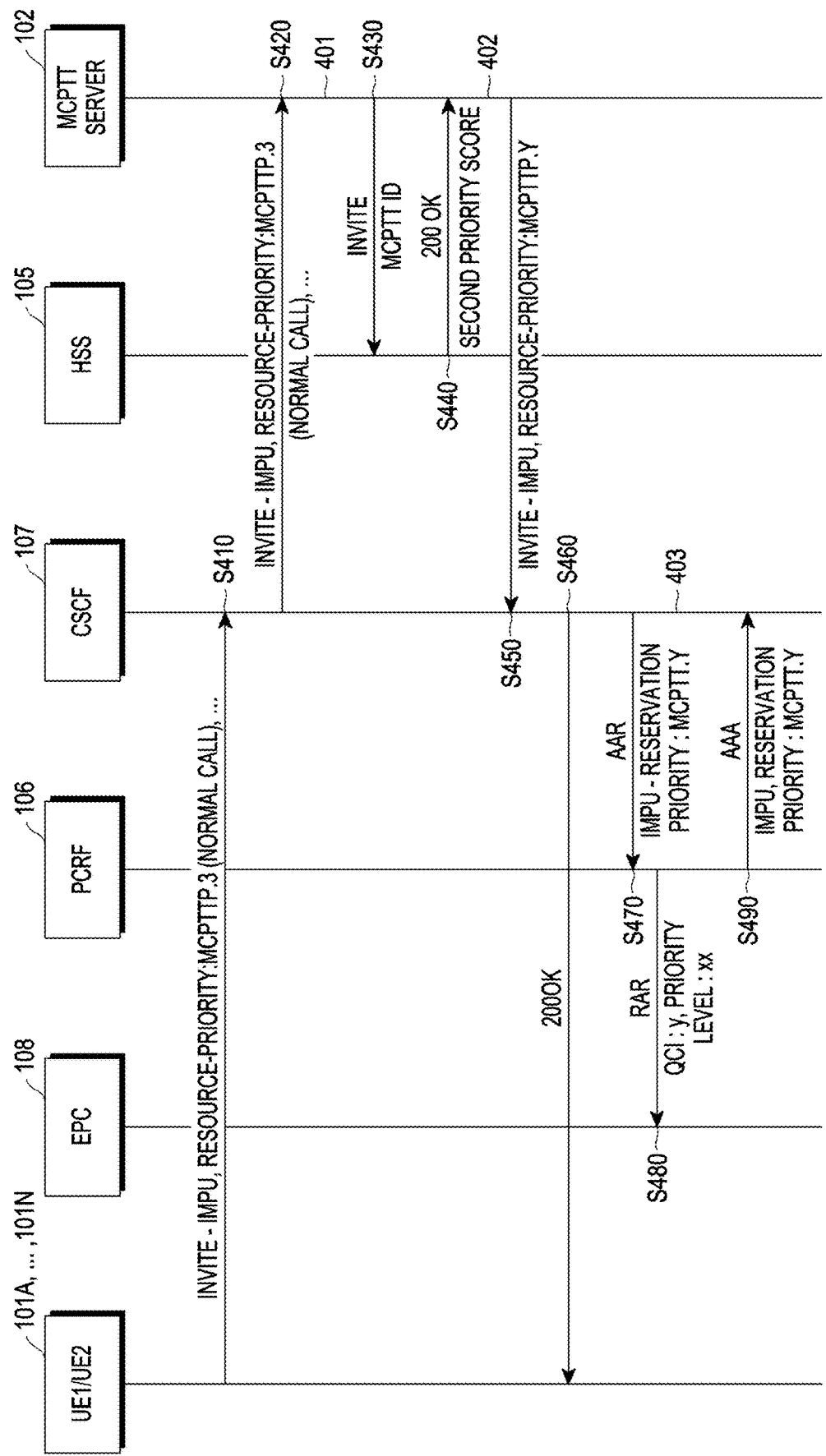
FIG. 4 shows an exemplary user profile configuration, in accordance with some embodiments of the present disclosure.

In an embodiment, referring to FIG. 4, an example of processing the request (104) for the connection using the MCPTT service is detailed. The request (104) for the connection with the normal call is initiated by the first user. At step (S410), the UE1 sends the request (104) using the INVITE message with the first priority score (302) to the CSCF. At step (S420), the CSCF further transmits the INVITE (INVITE message) to the MCPTT server (102). The MCPTT server (102) determines the type of the connection (301) as the "normal call" using the first priority score (302) of "Resource-Priority:mcpttp.3." The MCPTT server (102) identifies the "ParticipantType" value corresponding to the UE1 using IMPU (303) received in the INVITE denoted as (401) in FIG. 4. Further, the MCPTT server (102) obtains the "the type of the user (304)" from the HSS (105) using the IP multimedia subsystem (IMS) public user identity (IMPU) (303), received in the INVITE (S430, S440). Furthermore, the MCPTT server (102) determines the second priority score (305) corresponding to the type of the user (304) denoted as (402) in FIG. 4. The MCPTT server (102) decides to approve or reject the request (104) for the connection based on the first priority score (302) and the second priority score (305). Subsequently, the MCPTT server (102) modifies the resource priority header value using the combination of the first priority score (302) and the second priority score (305) when the MCPTT server (102) decides to approve the request (104) for the connection denoted as (402) in FIG. 4. The approved request (104) for the connection is provided to the CSCF at step (S450). Thereafter, the CSCF transmits the new priority value (i.e., the combination of the first priority score (302) and the second priority score (305)) to the PCRF for pre-empting the pre-existing call denoted as (403) in FIG. 4 and establishing the MCPTT call based the request (104) for the connection.

The CSCF transmits, to the UE1, a message indicating that the request (104) is approved at step (S460)

Exemplary Scenarios:

Scenario 1:

Consider, in a pre-existing connection, the dispatcher is associated with the normal call and the communication network (103) is in a congestion state. Further, if a normal user requests for the connection with the ambient call, then the MCPTT server (102) may approve the request (104) for the connection and the pre-existing (i.e., ongoing) dispatcher call may be pre-empted, because the ambient call has a higher first priority score (302) compared to the first priority score (302) of the normal call.

Scenario 2:

Consider, in the pre-existing connection, the dispatcher is associated with the ambient call and the communication network (103) is in the congestion state. Further, if the normal user requests for the connection with the ambient call, then the MCPTT server (102) rejects or places the request (104) in the queue, and the pre-existing call of the dispatcher may continue because the dispatcher has a higher second priority score (305) when compared with the normal user.

Scenario 3:

Consider, in the pre-existing connection, the dispatcher is associated with the broadcast call and the communication network (103) is in the congestion state. Further, if the normal user requests for the connection with the ambient call, then the MCPTT server (102) may place the request (104) for the connection in the queue and using the FIFO mechanism the normal user call may be approved after the dispatcher call is completed because the dispatcher has a higher second priority score (305) when compared to the normal user.

The method of providing priority for call connectivity in an MCPTT service manages a plurality of requests for the connection based on the first priority score (302) associated with the type of the connection (301) and the second priority score (305) associated with the type of the user (304). Further, the MCPTT server (102) enables pre-emption of the pre-existing connection based on the second priority score (305) associated with the type of the user (304). Further, the administrator may plan safety based on the emergency situation at any point of time by modifying the second priority score (305) associated with the type of the user (304).

A method for assigning priority in an MCPTT communication service, the method comprising receiving, by an MCPTT server (102), an MCPTT call request having a first priority score (302) from a UE (101A, 101B, . . . , 101N) associated with a user; determining, by the MCPTT server (102), a second priority score (305) of the user; comparing, by the MCPTT server (102), the first priority score (302) and the second priority score (305) with a permutation table; and providing, by the MCPTT server (102), a reservation priority score to the user based on the comparison.

Wherein, the permutation table is created by an administrator.

Wherein, the second priority score (305) includes a role of the user.

Wherein during a conflict between MCPTT calls, the first priority score (302) and second priority score (305) of the MCPTT calls are compared with the permutation table and the reservation priority score is assigned by the MCPTT server (102).

Wherein for the MCPTT calls having the conflict the reservation priority score is provided based on a FIFO manner.

Figure 5:
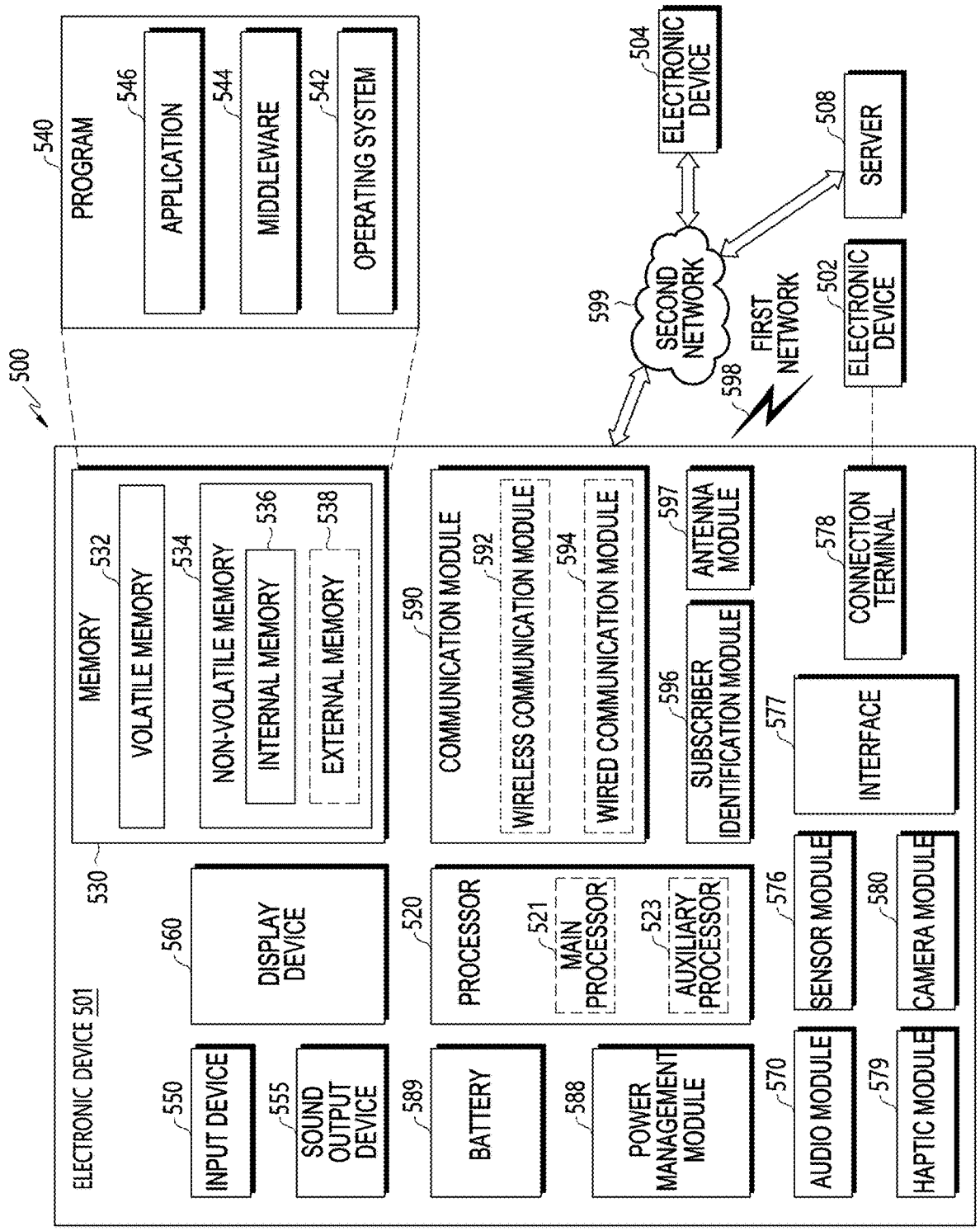
FIG. 5 is a block diagram illustrating an electronic device in a network environment according to various embodiments.

FIG. 5 is a block diagram illustrating an electronic device 501 in a network environment 500 according to various embodiments. Referring to FIG. 5, the electronic device 501 in the network environment 500 may communicate with an electronic device 502 via a first network 598 (e.g., a short-range wireless communication network), or at least one of an electronic device 504 or a server 508 via a second network 599 (e.g., a long-range wireless communication network). According to an embodiment, the electronic device 501 may communicate with the electronic device 504 via the server 508. According to an embodiment, the electronic device 501 may include a processor 520, memory 530, an input module 550, a sound output module 555, a display module 560, an audio module 570, a sensor module 576, an interface 577, a connecting terminal 578, a haptic module 579, a camera module 580, a power management module 588, a battery 589, a communication module 590, a subscriber identification module (SIM) 596, or an antenna module 597. In some embodiments, at least one of the components (e.g., the connecting terminal 578) may be omitted from the electronic device 501, or one or more other components may be added in the electronic device 501. In some embodiments, some of the components (e.g., the sensor module 576, the camera module 580, or the antenna module 597) may be implemented as a single component (e.g., the display module 560).

The processor 520 may execute, for example, software (e.g., a program 540) to control at least one other component (e.g., a hardware or software component) of the electronic device 501 coupled with the processor 520 and may perform various data processing or computation. According to one embodiment, as at least part of the data processing or computation, the processor 520 may store a command or data received from another component (e.g., the sensor module 576 or the communication module 590) in volatile memory 532, process the command or the data stored in the volatile memory 532, and store resulting data in non-volatile memory 534. According to an embodiment, the processor 520 may include a main processor 521 (e.g., a central processing unit (CPU) or an application processor (AP)), or an auxiliary processor 523 (e.g., a graphics processing unit (GPU), a neural processing unit (NPU), an image signal processor (ISP), a sensor hub processor, or a communication processor (CP)) that is operable independently from, or in conjunction with, the main processor 521. For example, when the electronic device 501 includes the main processor 521 and the auxiliary processor 523, the auxiliary processor 523 may be adapted to consume less power than the main processor 521, or to be specific to a specified function. The auxiliary processor 523 may be implemented as separate from, or as part of the main processor 521.

The auxiliary processor 523 may control at least some of functions or states related to at least one component (e.g., the display module 560, the sensor module 576, or the communication module 590) among the components of the electronic device 501, instead of the main processor 521 while the main processor 521 is in an inactive (e.g., sleep) state, or together with the main processor 521 while the main processor 521 is in an active state (e.g., executing an application). According to an embodiment, the auxiliary processor 523 (e.g., an image signal processor or a communication processor) may be implemented as part of another component (e.g., the camera module 580 or the communication module 590) functionally related to the auxiliary processor 523. According to an embodiment, the auxiliary processor 523 (e.g., the neural processing unit) may include a hardware structure specified for artificial intelligence model processing. An artificial intelligence model may be generated by machine learning. Such learning may be performed, e.g., by the electronic device 501 where the artificial intelligence is performed or via a separate server (e.g., the server 508). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 530 may store various data used by at least one component (e.g., the processor 520 or the sensor module 576) of the electronic device 501. The various data may include, for example, software (e.g., the program 540) and input data or output data for a command related thereto. The memory 530 may include the volatile memory 532 or the non-volatile memory 534.

The program 540 may be stored in the memory 530 as software, and may include, for example, an operating system (OS) 542, middleware 544, or an application 546.

The input module 550 may receive a command or data to be used by another component (e.g., the processor 520) of the electronic device 501, from the outside (e.g., a user) of the electronic device 501. The input module 550 may include, for example, a microphone, a mouse, a keyboard, a key (e.g., a button), or a digital pen (e.g., a stylus pen).

The sound output module 555 may output sound signals to the outside of the electronic device 501. The sound output module 555 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 560 may visually provide information to the outside (e.g., a user) of the electronic device 501. The display module 560 may include, for example, a display, a hologram device, or a projector and control circuitry to control a corresponding one of the display, hologram device, or projector. According to an embodiment, the display module 560 may include a touch sensor adapted to detect a touch, or a pressure sensor adapted to measure the intensity of force incurred by the touch.

The audio module 570 may convert a sound into an electrical signal and vice versa. According to an embodiment, the audio module 570 may obtain the sound via the input module 550, output the sound via the sound output module 555, or a headphone of an external electronic device (e.g., an electronic device 502) directly (e.g., wiredly) or wirelessly coupled with the electronic device 501.

The sensor module 576 may detect an operational state (e.g., power or temperature) of the electronic device 501 or an environmental state (e.g., a state of a user) external to the electronic device 501, and then generate an electrical signal or data value corresponding to the detected state. According to an embodiment, the sensor module 576 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 577 may support one or more specified protocols to be used for the electronic device 501 to be coupled with the external electronic device (e.g., the electronic device 502) directly (e.g., wiredly) or wirelessly. According to an embodiment, the interface 577 may include, for example, a high definition multimedia interface (HDMI), a universal serial bus (USB) interface, a secure digital (SD) card interface, or an audio interface.

A connecting terminal 578 may include a connector via which the electronic device 501 may be physically connected with the external electronic device (e.g., the electronic device 502). According to an embodiment, the connecting terminal 578 may include, for example, a HDMI connector, a USB connector, a SD card connector, or an audio connector (e.g., a headphone connector).

The haptic module 579 may convert an electrical signal into a mechanical stimulus (e.g., a vibration or a movement) or electrical stimulus which may be recognized by a user via his tactile sensation or kinesthetic sensation. According to an embodiment, the haptic module 579 may include, for example, a motor, a piezoelectric element, or an electric stimulator.

The camera module 580 may capture a still image or moving images. According to an embodiment, the camera module 580 may include one or more lenses, image sensors, image signal processors, or flashes.

The power management module 588 may manage power supplied to the electronic device 501. According to one embodiment, the power management module 588 may be implemented as at least part of, for example, a power management integrated circuit (PMIC).

The battery 589 may supply power to at least one component of the electronic device 501. According to an embodiment, the battery 589 may include, for example, a primary cell which is not rechargeable, a secondary cell which is rechargeable, or a fuel cell.

The communication module 590 may support establishing a direct (e.g., wired) communication channel or a wireless communication channel between the electronic device 501 and the external electronic device (e.g., the electronic device 502, the electronic device 504, or the server 508) and performing communication via the established communication channel. The communication module 590 may include one or more communication processors that are operable independently from the processor 520 (e.g., the application processor (AP)) and supports a direct (e.g., wired) communication or a wireless communication. According to an embodiment, the communication module 590 may include a wireless communication module 592 (e.g., a cellular communication module, a short-range wireless communication module, or a global navigation satellite system (GNSS) communication module) or a wired communication module 594 (e.g., a local area network (LAN) communication module or a power line communication (PLC) module). A corresponding one of these communication modules may communicate with the external electronic device via the first network 598 (e.g., a short-range communication network, such as Bluetooth™, wireless-fidelity (Wi-Fi) direct, or infrared data association (IrDA)) or the second network 599 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 592 may identify and authenticate the electronic device 501 in a communication network, such as the first network 598 or the second network 599, using subscriber information (e.g., international mobile subscriber identity (IMSI)) stored in the subscriber identification module 596.

The wireless communication module 592 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 592 may support a high-frequency band (e.g., the mmWave band) to achieve, e.g., a high data transmission rate. The wireless communication module 592 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 592 may support various requirements specified in the electronic device 501, an external electronic device (e.g., the electronic device 504), or a network system (e.g., the second network 599). According to an embodiment, the wireless communication module 592 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 597 may transmit or receive a signal or power to or from the outside (e.g., the external electronic device) of the electronic device 501. According to an embodiment, the antenna module 597 may include an antenna including a radiating element composed of a conductive material or a conductive pattern formed in or on a substrate (e.g., a printed circuit board (PCB)). According to an embodiment, the antenna module 597 may include a plurality of antennas (e.g., array antennas). In such a case, at least one antenna appropriate for a communication scheme used in the communication network, such as the first network 598 or the second network 599, may be selected, for example, by the communication module 590 (e.g., the wireless communication module 592) from the plurality of antennas. The signal or the power may then be transmitted or received between the communication module 590 and the external electronic device via the selected at least one antenna. According to an embodiment, another component (e.g., a radio frequency integrated circuit (RFIC)) other than the radiating element may be additionally formed as part of the antenna module 597.

According to various embodiments, the antenna module 597 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 501 and the external electronic device 504 via the server 508 coupled with the second network 599. Each of the electronic devices 502 or 504 may be a device of a same type as, or a different type, from the electronic device 501. According to an embodiment, all or some of operations to be executed at the electronic device 501 may be executed at one or more of the external electronic devices 502, 504, or 508. For example, if the electronic device 501 may perform a function or a service automatically, or in response to a request from a user or another device, the electronic device 501, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 501. The electronic device 501 may provide the outcome, with or without further processing of the outcome, as at least part of a reply to the request. To that end, a cloud computing, distributed computing, mobile edge computing (MEC), or client-server computing technology may be used, for example. The electronic device 501 may provide ultra low-latency services using, e.g., distributed computing or mobile edge computing. In another embodiment, the external electronic device 504 may include an internet-of-things (IoT) device. The server 508 may be an intelligent server using machine learning and/or a neural network. According to an embodiment, the external electronic device 504 or the server 508 may be included in the second network 599. The electronic device 501 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 540) including one or more instructions that are stored in a storage medium (e.g., internal memory 536 or external memory 538) that is readable by a machine (e.g., the electronic device 501). For example, a processor (e.g., the processor 520) of the machine (e.g., the electronic device 501) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments, the electronic device (501) may include the MCPTT server and at least one UE in FIGS. 1 to 6. The server (508) may include the MCPTT server in FIGS. 1-6

Figure 6:
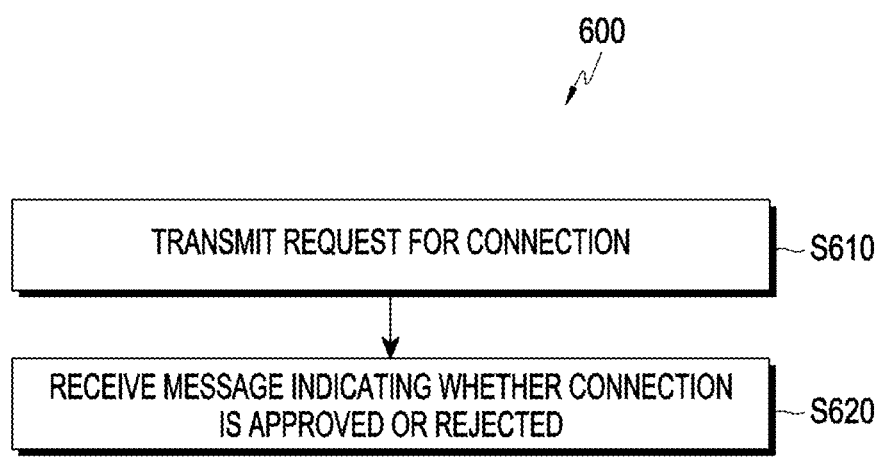
FIG. 6 shows an exemplary flowchart illustrating the method steps of UE in a wireless communication in accordance with some embodiments of the present disclosure.

FIG. 6 shows an exemplary flowchart illustrating the method steps of communicating in (MCPTT) service, in accordance with some embodiments of the present disclosure.

At the step (S610), the UE (101A, 101B, . . . , 101N) transmits the request (104) for the connection to the MCPTT server (102). The UE (101A, 101B, . . . , 101N) is associated with the first user to communicate with the one or more second UEs (101A, 101B, . . . , 101N) associated with the one or more second users as shown in FIG. 3A. The request (104) includes at least the first priority score associated with a type of the connection (301).

In an embodiment, the first priority score is a number indicating the preference associated with the type of the connection (301). The type of the connection (301) indicates at least one of the normal call, the broadcast call, the ambient call, the imminent peril call, or the emergency call. The normal call is a private call between the first user and the second user. The broadcast call is a group call from the first user to a plurality of second users. The imminent peril call from the first user to the one or more second users may be a private call, or a group call and indicates a requirement of an urgent action before the occurrence of an emergency situation. The ambient call indicates a passive listening mode in an existing MCPTT call. The emergency call indicates a report of the emergency situation by the first user. For example, the first priority score (302) associated with the type of the connection (301) is shown in FIG. 3B.

In an embodiment, the request (104) for connection indicates at least one of a new MCPTT call request (104), a floor request (104) in a pre-existing (i.e., ongoing) MCPTT call, or the like. The person skilled in the art appreciates the use of MCPTT message protocol such as INVITE request (104) for sending the request (104) for the connection to the MCPTT server (102).

At the step (203), the UE (101A, 101B, . . . , 101N) receives a message for approving the request (104) for the connection or rejecting the request (104) for the connection. The approving or rejecting the connection is performed by the MCPTT server based on the first priority score (302) and the second priority score (305).

A UE in a wireless communication system, the UE (101) comprises: a transceiver; and at least one processor coupled to the transceiver; wherein the at least one processor is configured to transmit, to an MCPTT server via the transceiver, a request (104) for a connection, wherein the request (104) includes at least a first priority score (302) associated with a type of the connection (301), and receive, from the MCPTT server, a message indicating whether the connection is approved or rejected.

wherein the first priority score (302) is a number indicating a preference associated with the type of the connection (301), wherein the type of the connection (301) indicates at least one of a normal call, a broadcast call, an ambient call, an imminent peril call, or an emergency call.

wherein a second priority score (302) is a number indicting a preference associated with type information of the UE (304), wherein the type information of the UE (304) indicates at least one of a normal UE, a supervisor UE, or a dispatcher UE.

wherein the first priority score (302) and a second priority score (305) associated with a pre-existing connection corresponding to one or more second users is identified by the MCPTT server, wherein a combination of the first priority score (302) and the second priority score (305) associated with the pre-existing connection is compared with the combination of the first priority score (302) and the second priority score (305) associated with the request (104) for the connection, wherein the pre-existing connection is pre-empted in case that the combination of the first priority score (302) and the second priority score (305) associated with the pre-existing connection is less than the combination of the first priority score (302) and the second priority score (305) associated with the request (104) for the connection, and wherein when the pre-existing connection is pre-empted, the message indicating the connection is approved is received.

wherein the first priority score (302) and a second priority score (305) associated with a pre-existing connection corresponding to one or more second UE is identified by the MCPTT server, wherein a combination of the first priority score (302) and the second priority score (305) associated with the pre-existing connection is compared with the combination of the first priority score (302) and the second priority score (305) associated with the request (104) for the connection, wherein in case that the combination of the first priority score (302) and the second priority score (305) associated with the pre-existing connection is greater than the combination of the first priority score (302) and the second priority score (305) associated with the request (104) for the connection, the message indicating that the connection is rejected is received.

wherein the second priority score (305) includes a role of the UE.

It will be understood by those within the art that, in general, terms used herein, and are generally intended as "open" terms (e.g., the term "including" should be interpreted as "including but not limited to," the term "having" should be interpreted as "having at least," the term "includes" should be interpreted as "includes but is not limited to," etc.). For example, as an aid to understanding, the detail description may contain usage of the introductory phrases "at least one" and "one or more" to introduce recitations. However, the use of such phrases should not be construed to imply that the introduction of a recitation by the indefinite articles "a" or "an" limits any particular part of description containing such introduced recitation to inventions containing only one such recitation, even when the introductory phrases "one or more" or "at least one" and indefinite articles such as "a" or "an" (e.g., "a" and/or "an" should typically be interpreted to mean "at least one" or "one or more") are included in the recitations; the same holds true for the use of definite articles used to introduce such recitations. In addition, even if a specific part of the introduced description recitation is explicitly recited, those skilled in the art will recognize that such recitation should typically be interpreted to mean at least the recited number (e.g., the bare recitation of "two recitations," without other modifiers, typically means at least two recitations, or two or more recitations).

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a mission critical push-to-talk (MCPTT) server, the method comprises:
    receiving, from a first user equipment (UE), a request for a connection to communicate with one or more second UEs, wherein the request includes at least a first priority score associated with a type of the connection;
    determining, based on the request, a second priority score corresponding to the first UE, wherein the second priority score is associated with type information;
    retaining the first priority score in case that the first priority score is greater than the second priority score;
    modifying the first priority score to the second priority score in case that the first priority score is less than the second priority score;
    identifying a third priority score associated with a pre-existing connection, wherein the third priority score is associated with a type of the pre-existing connection; and
    performing, based on the retained or modified first priority score and the second priority score, one of:
        approving the request for the connection in case that the retained or modified first priority score is less than the third priority score, or
        rejecting the request for the connection in case that the retained or modified first priority score is less than the third priority score.

2. The method of claim 1, wherein the first priority score is a number indicating a preference associated with the type of the connection that indicates at least one of a normal call, a broadcast call, an ambient call, an imminent peril call, or an emergency call.

3. The method of claim 1, wherein the second priority score is a number indicting a preference associated with the type information that indicates at least one of a normal UE, a supervisor UE, or a dispatcher UE.

4. The method of claim 1, wherein determining the second priority score comprises:
   identifying, based on the request, an identity value corresponding to the first UE;
   obtaining, based on the identity value, the type information from a database associated with the MCPTT server; and
   retrieving the second priority score corresponding to the type information from a storage medium associated with the MCPTT server.

5. The method of claim 1, wherein approving the request for the connection comprises:
   identifying the first priority score and the second priority score associated with the pre-existing connection corresponding to the one or more second UEs;
   comparing a combination of the first priority score and the second priority score associated with the pre-existing connection with the combination of the first priority score and the second priority score associated with the request for the connection of the first UE;
   pre-empting the pre-existing connection in case that the combination of the first priority score and the second priority score associated with the pre-existing connection is less than the combination of the first priority score and the second priority score associated with the request for the connection; and
   approving the request for the connection.

6. The method of claim 1, wherein rejecting the request for the connection comprises:
   identifying the first priority score and the second priority score associated with the pre-existing connection corresponding to the one or more second UEs;
   comparing a combination of the first priority score and the second priority score associated with the pre-existing connection with the combination of the first priority score and the second priority score associated with the request for the connection of the first UE; and
   rejecting the request for the connection in case that the combination of the first priority score and the second priority score associated with the pre-existing connection is greater than the combination of the first priority score and the second priority score associated with the request for the connection.

7. The method of claim 1, further comprising dynamically modifying, based on an input received from an administrator device associated with the MCPTT server, the second priority score associated with the type information.

8. A mission critical push-to-talk (MCPTT) server in a wireless communication system, the MCPTT server comparing:
   a processor; and
   a memory communicatively coupled to the processor, wherein the memory stores processor executable instructions which on execution causes the processor to:
   receive, from a first user equipment (UE), a request for a connection to communicate with one or more second UEs, wherein the request includes at least a first priority score associated with a type of the connection;
   determine, based on the request, a second priority score corresponding to the first UE, wherein the second priority score is associated with type information;
   retain the first priority score in case that the first priority score is greater than the second priority score;
   modify the first priority score to the second priority score in case that the first priority score is less than the second priority score;
   identify a third priority score associated with a pre-existing connection, wherein the third priority score is associated with a type of the pre-existing connection; and
   perform, based on the retained or modified first priority score and the second priority score, one of:
      approving the request for the connection in case that the retained or modified first priority score is greater than the third priority score, or
      rejecting the request for the connection in case that the retained or modified first priority score is less than the third priority score.

9. The MCPTT server of claim 8, wherein the processor is configured to:
   identify, based on the request, an identity value corresponding to the first UE;
   obtain, based on the identity value, the type information from a database associated with the MCPTT server; and
   retrieve the second priority score corresponding to the type information from a storage medium associated with the MCPTT server.

10. The MCPTT server of claim 8, wherein the processor is configured to:
    identify the first priority score and the second priority score associated with the pre-existing connection corresponding to the one or more second UEs;
    compare a combination of the first priority score and the second priority score associated with the pre-existing connection with the combination of the first priority score and the second priority score associated with the request for the connection of the first UE;
    pre-empt the pre-existing connection in case that the combination of the first priority score and the second priority score associated with the pre-existing connection is less than the combination of the first priority score and the second priority score associated with the request for the connection; and
    approve the request for the connection.

11. The MCPTT server of claim 8, wherein the processor is configured to:
    identify the first priority score and the second priority score associated with the pre-existing connection corresponding to the one or more second UEs;
    compare a combination of the first priority score and the second priority score associated with the pre-existing connection with the combination of the first priority score and the second priority score associated with the request for the connection of the first UE; and
    reject the request for the connection in case that the combination of the first priority score and the second priority score associated with the pre-existing connection is greater than the combination of the first priority score and the second priority score associated with the request for the connection.

12. The MCPTT server of claim 8, wherein the processor is configured to dynamically modify, based on an input from an administrator device associated with the MCPTT server, the second priority score associated with the type information.

* * * * *